Patented Nov. 12, 1946

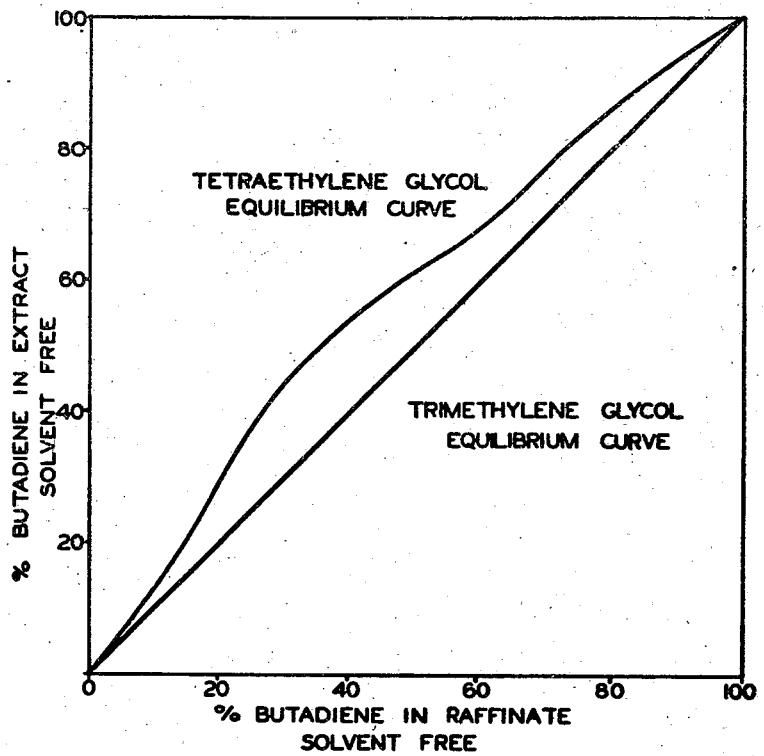

2,411,025

UNITED STATES PATENT OFFICE 2,411,025

SOLVENT EXTRACTION OF UNSATURATED HYDROCARBON MIXTURES

Charles A. Coghlan, Beacon, N. Y., assignor to The Texas Company, New York, N. Y., a corporation of Delaware Application February 9, 1944, Serial No. 521,628

5 Claims. (Cl. 260—681.5)

This invention relates to the solvent separation of hydrocarbon mixtures by extraction with a solvent comprising a polyhydric glycol having a relatively high molecular weight.

The invention has to do with a continuous process of separating butadiene from hydrocarbon mixtures containing it, and other olefin hydrocarbons, and involves effecting separation with a polyhydric glycol having a molecular weight within the range about 200 to 400 and preferably not in excess of about 1000.

A polyhydric glycol of the foregoing character exerts selective action as between butadiene and other $C_4$ olefins. Thus it has been found that tetraethylene glycol exerts such selective action, whereas a lower molecular weight glycol, such as trimethylene glycol for example, does not exert such selective action, at least under conditions which are commercially operative.

Hydrocarbon mixtures containing about 40% butadiene, 26% isobutylene, 30% butylene-2, 2% isobutane, and 2% normal butane were extracted at a temperature of about 100° F. with tetraethylene glycol and with trimethylene glycol. In each case the $C_4$ mixture, while maintained in the liquid phase, was treated with an equal quantity of the glycol compound and allowed to stand at an extraction temperature of about 100° F. to form extract and raffinate phases. These phases were then separately removed, stripped of solvent, and analyzed to determine their butadiene content.

In the case of the extraction with tetraethylene glycol, the solvent-free extract contained about 54.5% butadiene while the solvent-free raffinate contained about 39.1% butadiene. On the other hand, when extracting with trimethylene glycol, the solvent-free extract contained 44.2% butadiene while the solvent-free raffinate contained 43.1% butadiene. In other words, the butadiene contents of the extract and raffinate phases when extracting with trimethylene glycol were substantially the same, which is to be contrasted with the results obtained when extracting with tetraethylene glycol. Substantially the same difference in solvent action exists for extraction temperatures within the range 70 to 300° F.

This relationship is also shown in the accompanying drawing which comprises a graph showing the equilibrium curves for tetraethylene glycol and trimethylene glycol. These curves show the equilibrium relationship between these solvents and butadiene in a $C_4$ hydrocarbon mixture of the foregoing character at 100° F. As indicated, the equilibrium curve for trimethylene glycol is substantially a straight line, whereas that for tetraethylene glycol is not. A straight line relationship in the case of trimethylene glycol indicates its lack of selectivity because at any given point along the curve the butadiene content of the extract is substantially the same as that for the raffinate.

The invention is applicable to the separation of butadiene from $C_4$ hydrocarbon mixtures containing the butadiene in substantial amount. Such mixtures may be obtained by the dehydrogenation treatment of $C_4$ hydrocarbons obtained from different sources and advantageously those obtained in the catalytic cracking of hydrocarbons to produce gasoline. Extraction of butadiene from an olefin mixture containing it may be effected by subjecting the olefin mixture to contact with the solvent of this invention in stage or continuous countercurrent flow. According to one method of operation the extraction may be effected in a packed tower through which the solvent and feed hydrocarbon mixture flow countercurrently. The feed hydrocarbons may be introduced to the reaction tower in either the gas or liquid phase.

In employing an extraction tower the feed hydrocarbon mixture is advantageously introduced to the tower at an intermediate point while the solvent liquid is introduced to the upper portion of the tower. As a result of the contact between the hydrocarbons and the solvent liquid, extract and raffinate phases are formed. The raffinate phase rises to the upper portion of the tower and is continuously withdrawn therefrom while the extract phase descends toward the bottom of the tower from which it is continuously withdrawn. A portion of the withdrawn extract phase after removal of the solvent is advantageously recycled to the lower portion of the extraction tower at a point substantially below the point of feed hydrocarbon introduction. By recycling extract in this manner, the section of the tower below the point of feed hydrocarbon introduction operates as a rectiflow section, permitting the production of an ultimate extract of high butadiene content.

The operation may be carried out so as to produce an ultimate extract consisting essentially of butadiene and solvent so that the solvent-free extract will comprise at least 98% butadiene. The butadiene so separated from the feed hydrocarbon mixture may amount to from 70 to 95% by volume of the total butadiene content of the charge depending upon the ratio of solvent to feed hydrocarbon mixture, extraction temperature, and proportion of extract recycle employed.

For example, a feed hydrocarbon mixture containing 20% butadiene, 35% isobutylene, 40% butylene-2, 3% isobutane, and about 2% normal butane by volume is charged to the intermediate portion of the extraction tower maintained at a temperature of about 100 to 110° F., and under pressure sufficient to maintain the hydrocarbons in the liquid phase. Tetraethylene glycol is introduced to the upper portion of the tower in the proportion of about 10 volumes of solvent to 1 volume of hydrocarbon feed. Extract phase is continuously withdrawn from the bottom of the tower and a portion thereof, after removal of the solvent, continuously returned to the tower at a point near the point of extract withdrawal. The amount of solvent-free extract so-recycled is about 2.43 volumes per volume of feed hydrocarbon mixture charged to the tower.

The solvent-free extract amounts to about 14.3% by volume of the feed hydrocarbon mixture and contains about 98% butadiene, the remaining small amount consisting of more saturated olefins.

The raffinate phase after removal of the solvent will amount to about 85.7% by volume of the feed hydrocarbon mixture.

The raffinate phase as removed from the top of the tower will contain a relatively small amount of solvent, about 0.2% and usually not in excess of about 1% by volume. The solvent may be removed from the raffinate phase by scrubbing with water, and the resulting mixture of water and tetraethylene glycol is then subjected to distillation to strip the solvent from the water after which the solvent may be used again.

The extract phase which comprises butadiene and the bulk of the solvent is subjected to fractional distillation to strip the butadiene from the solvent following which the solvent may be reused in the extraction tower.

In the foregoing example the butadiene obtained in the extract amounts to about 70% of the total butadiene contained in the feed hydrocarbon mixture. By increasing the solvent dosage and the amount of extract recycle, the butadiene recovery may be increased to about 95%; for example, the solvent dosage may be increased to about 30 volumes of solvent per volume of feed hydrocarbon mixture while the extract recycle may be raised to 4 volumes of solvent-free extract per volume of feed hydrocarbon mixture. It is contemplated that in practice the extraction temperature employed for separating butadiene from a C4 hydrocarbon mixture may range from about 70° F. to about 325° F., the latter temperature being the critical temperature of butadiene. Temperatures below 70° F. are not advantageous because the high molecular weight glycols become more viscous so that separation between extract and raffinate phases is less efficient. Moreover, at these low temperatures the per cent recovery of butadiene is relatively small and the amount of solvent required in the system becomes excessive.

Generally speaking it is desirable to effect the extraction at a temperature not exceeding about 200° F. since at higher temperatures the extract obtained has a higher content of other olefins.

While mention has been made of liquid-liquid extraction, it is also contemplated that extractive distillation may be employed using the foregoing type of solvent. In such operation the butadiene is removed from the bottom of the tower along with the solvent while the more saturated olefins are removed as a distillate from the upper portion of the extraction tower.

It is also contemplated that the extraction process may be carried out to obtain an extract phase containing somewhat lower concentrations of butadiene, for example, 70 to 80% rather than 98%. The extract phase so-obtained may be passed to another treating zone wherein the butadiene is recovered by azeotropic distillation using ammonia or some other suitable compound as an azeotrope former. In this way butadiene of 99% or more purity may be recovered from the primary extract phase. Advantageously the solvent is stripped from the extract phase prior to subjecting it to azeotropic distillation.

Other glycols which may be used comprise hexaethylene glycol having a molecular weight of about 300, and nonaethylene glycol having a molecular weight of about 400.

Obviously many modifications and variations of the invention as above set forth may be made without departing from the spirit and scope thereof, and therefore only such limitations should be imposed as are indicated in the appended claims.

I claim:

1. The process for separating butadiene from hydrocarbon mixtures containing it and $C_4$ mono-olefins which comprises subjecting a $C_4$ hydrocarbon mixture of said olefins to contact with a polyethylene glycol having a molecular weight in the range from that for tetraethylene glycol up to 1000, selectively dissolving butadiene in said glycol during said contact, withdrawing said solution from undissolved mono-olefin hydrocarbons, and recovering dissolved butadiene from the glycol solvent.

2. The process for separating butadiene from a hydrocarbon mixture containing it and $C_4$ mono-olefins which comprises subjecting a $C_4$ hydrocarbon mixture of said olefins to contact with tetraethylene glycol, selectively dissolving butadiene in said glycol during said contact, withdrawing said solution from undissolved mono-olefin hydrocarbons, and recovering dissolved butadiene from the glycol solvent.

3. A process for separating butadiene from a $C_4$ hydrocarbon mixture containing it and mono-olefins which comprises subjecting said $C_4$ mixture to counter-current contact with a stream of tetraethylene glycol, effecting said contact at a temperature in the range about 70 to 325° F., forming an extract phase comprising butadiene dissolved in the bulk of the solvent and a raffinate phase comprising $C_4$ mono-olefins, separating said phases, and removing butadiene from the separated extract phase.

4. The method according to claim 3 in which the extractive contact is effected at a temperature of about 100° F.

5. The process for separating butadiene from a $C_4$ hydrocarbon mixture containing it and mono-olefins which comprises subjecting said mixture to contact with a polyethylene glycol having a molecular weight in the range from that for tetraethylene glycol up to 400, selectively dissolving butadiene in said glycol during said contact at a temperature in the range about 70 to 325° F., withdrawing said solution from undissolved mono-olefin hydrocarbons, and recovering butadiene from the glycol solvent.

CHARLES A. COGHLAN.